Dec. 8, 1925.  
H. R. CUNNINGHAM  
1,564,533  
VALVE CONTROL MECHANISM  
Filed March 8, 1924   2 Sheets-Sheet 1

INVENTOR.
H. R. CUNNINGHAM.
BY
B. J. Craig
ATTORNEY.

Dec. 8, 1925.                                                                        1,564,533
H. R. CUNNINGHAM
VALVE CONTROL MECHANISM
Filed March 8, 1924                    2 Sheets-Sheet 2
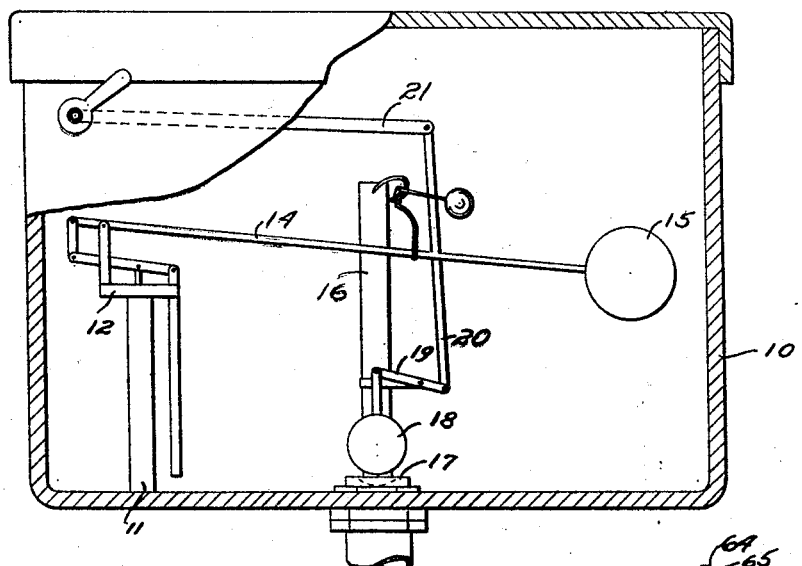
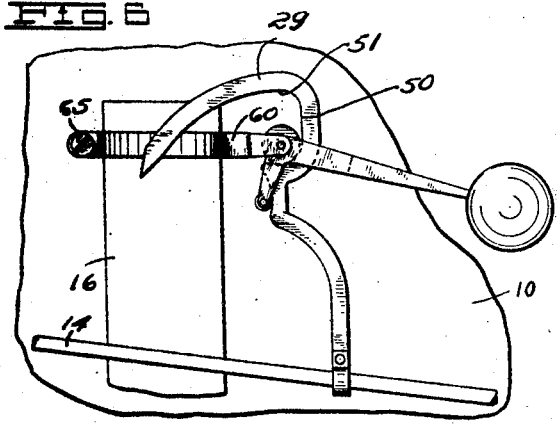
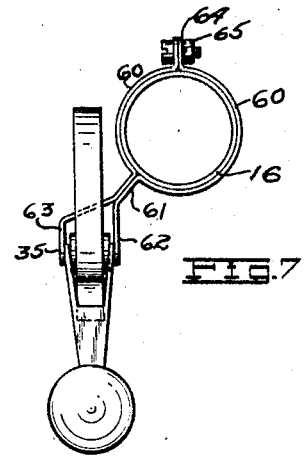
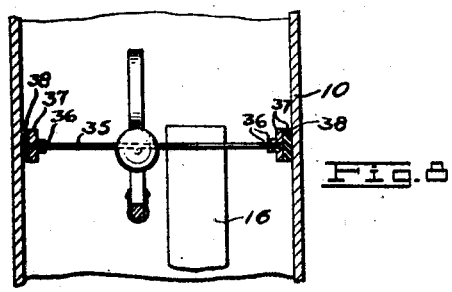
INVENTOR.
H. R. CUNNINGHAM
BY B. J. Craig
ATTORNEY.

Patented Dec. 8, 1925.

1,564,533

UNITED STATES PATENT OFFICE.

HERMAN R. CUNNINGHAM, OF GLENDALE, CALIFORNIA.

VALVE-CONTROL MECHANISM.

Application filed March 8, 1924. Serial No. 697,721.

*To all whom it may concern:*

Be it known that I, HERMAN R. CUNNINGHAM, a citizen of the United States, residing at Glendale, in the county of Los Angeles and State of California, have invented a certain new and useful Improvement in Valve-Control Mechanism, of which the following is a full, clear, and exact description, reference being had to the accompanying drawings.

This invention relates to devices for operating valves which control the flow of water to and from containers and has particular reference to such devices which are adapted for controlling the flow of water to flushing tanks.

In devices of the character described which are in general use, a valve is provided which is automatically opened when the tank is emptied to allow water to flow into the tank. As the tank fills the water carries a float with it and when this float reaches a predetermined height the valve gradually closes.

A valve mechanism of the character described is frequently faulty in that a loud hissing noise accompanies the closing of the valve. Moreover when the valve becomes slightly worn there is a likelihood of leaks developing due to the fact that the float is only partially submerged so that its full buoyant effect does not act to hold the valve on its seat.

The general object of my invention is to provided a flush tank valve including the usual valve operating lever and float with a control mechanism which may be readily attached without disturbing or moving any of the parts.

One of the specific objects of my invention is to provide a valve controlling mechanism which may be attached adjacent the overflow pipe of a flush tank without changing any parts of the valve mechanism and which will operate to hold the valve operating lever down until the water reaches a predetermined height.

Another object of the invention is to provide a positive means for holding the operating lever of a flush tank down until the tank is entirely filled after which the valve will operate to close the valve.

An additional object of the invention is to provide a novel means for supporting a controlling mechanism for flush tank valve levers.

Figure 1:
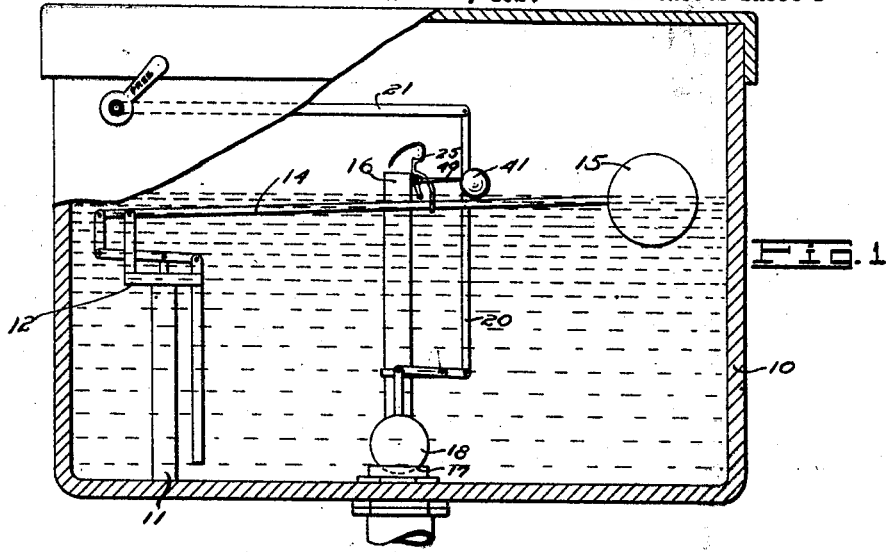
Figure 2:
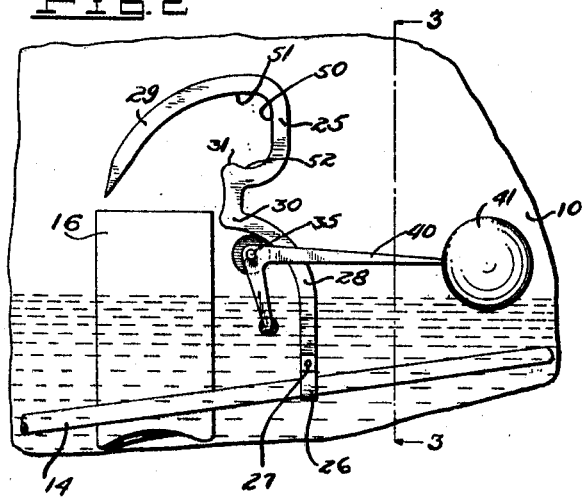
Figure 3:
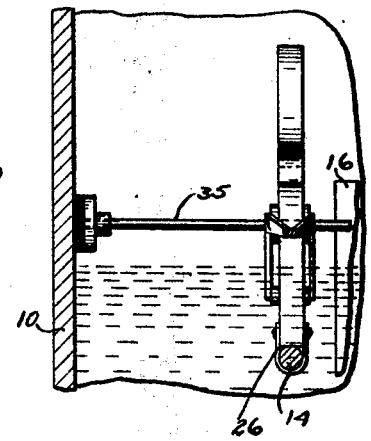
Figure 4:
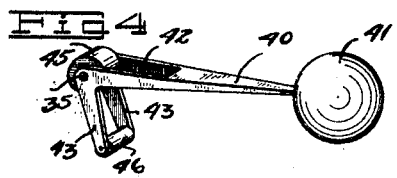

Other objects of the invention will be apparent from the following description taken in connection with the accompanying drawing wherein Fig. 1 is a section through a flush tank showing my improvement in elevation; Fig. 2 is an enlarged detail showing the parts constituting my invention; Fig. 3 is a section on line 3—3, Fig. 2 showing the operating mechanism in elevation; Fig. 4 is a perspective view of the auxiliary float and its supporting member; Fig. 5 is a section similar to Fig. 1 showing the parts in another position; Fig. 6 is an enlarged detail similar to Fig. 5 showing a modified form of support; Fig. 7 is a top plan view of the mechanism shown in Fig. 6; Fig. 8 is a section through the tank and the supporting member showing the operating mechanism in plan.

Referring to the drawing by reference characters, I have shown a tank at 10. The tank contains a valve mechanism 12, the inlet pipe 11 of which may be connected with the water supply. The valve mechanism may be operated by an operating lever 14 which is indicated as provided with a float 15 at one end. When the float is in the raised position as shown in Fig. 1 the valve (not shown) of the valve mechanism 12 is closed while when the float is in the depressed position as shown in Fig. 5 the valve will be open.

Construction such as that described are in common use and a further description of the details is believed unnecessary.

The tank 10 is shown as provided with an over-flow pipe 16 and with an outlet 17. The outlet 17 is controlled by a ball valve 18 which may be operated through levers 19, 20, and 21 when desired.

In order to cause the valve to close quickly and thereby prevent objectional hissing noises and also in order that the full buoyant effect of the float 15 may be obtained, I provide means which causes the valve lever 14 to remain depressed until the tank is filled to the desired height after which the valve lever 14 will be released.

By referring to the drawing it will be noted that I have provided upon the lever 14 a locking member 25. This member is shown as secured to the lever 14 by means of a clip 26. The clip 26 is so constructed that the member 25 may pivot about the fastening member 27.

The member 25 as shown in the drawing is substantially L-shaped and comprises a leg 28 having a foot 29 extending therefrom. The leg 28 is provided with a re-entrant portion 30. The re-entrant portion 30 is shown as provided with a humped shaped portion 31 at the top thereof. The member 25 may be constructed from a metal stamping or casting or in any desired manner.

Adjacent to the member 25 I show a shaft 35. The shaft 35 is indicated as threaded at 36 at each end to receive threaded retaining members 37. The retaining members 37 may be provided with cushion surfaces 38 if desired. The threads 36 on opposite ends of the shaft 35 may be right and left handed so that as the shaft 35 is turned the fastening members 37 will engage the sides of the tank 10 to thus firmly hold the shaft 35 in place.

Secured upon the shaft 35 I show an L-shaped supporting member 40. The supporting member is provided at one end with a float 41. The other end of the member 40 is bifurcated as at 42 to form two arms 43—43. The shaft 35 passes through the intermediate portions of the arms 43 and upon this shaft I secure a roller 45. Upon the lower ends of the arms 43 I secure another roller 46. The shaft 35 is mounted so that normally the parts assume the position as shown in Fig. 2 when the tank 10 is filled with water.

The lower portion 28 of the member 25 passes through the bifurcated arms 42 so that this portion may engage the roller 45. When the level of water in the tank 10 falls the float 15 moves down on the surface of the water. The arm 28 likewise moves down with the roller 45 engaging the lower surface of the arm.

The center of gravity of the member 25 is so aranged that it falls to the left of the pivot 27 so that as soon as the member 25 moves down so that the protuberance is below the roller 45 the member 25 will move to the left in Fig. 2 until the roller 45 engages the inner wall 50 of the member 25. The lever 14 with the float 15 continues to move downward until movement is restrained by the roller 45 engaging the under surface 51 of the foot 29 of the member 25.

As the water level rises in the tank 10, the arm 25 ascends until the roller 45 engages within the pocket 52 formed by the hump 31. Upward movement of the valve lever 14 is thus arrested before the valve has started its closing act. The valve remaining open, the level of water rises in the tank 10. When the water in the tank 10 has reached the level of the auxiliary float 41 it begins to exert an upward pressure against this float. When the upward buoyant effect of the float 41 is increased sufficiently the float 41 rotates about its shaft 35 and rocks the member 40 thus moving the roller 46 against the re-entrant portion 30 of the member 25 and forcing the member 25 to the right in Fig. 6. This clears the roller 45 from the hump 31 so that the member 25 is free to move upwardly. The member 25 is then moved upwardly by the buoyant effect of the float 15 thus causing the operating member 14 to quickly move to valve closing position.

From the foregoing description it will be apparent that the operation of my device is positive and that the valve will be held open until the tank is nearly filled with water whereupon the valve will close suddenly. The level at which the tank will fill can be adjusted by moving the shaft 35 upward or downward to the desired position.

It might sometimes be desirable to secure the shaft 35 directly upon the overflow pipe. In Figs. 6 and 7 I show a means for securing the shaft 35 to the overflow pipe. This means is shown as comprising a pair of curved members 60 which surround the tank and which are joined preferably at 61 where they diverge to form arms 62 and 63. The arms 62 and 63 receive the shaft 35. The ends of the members 60 may be bent to position as at 64 and may be secured by a fastening member 65.

Having thus described my invention, I claim:

1. In combination with a flush tank including a container, a valve near one end of the container for controlling the supply of water thereto, a lever for operating said valve, said lever extending to the end of the container, a float on said lever and an overflow pipe near the center of the container, means to control the movement of said lever, said means including a locking member pivotally mounted upon said lever, a pivoted member mounted adjacent the overflow pipe and an auxiliary float on said pivoted member, said locking member and said pivoted member having coacting portions serving to hold said lever depressed when said auxiliary float is in its lower position.

2. In a flush tank, a container, a water inlet, an outlet, an over-flow pipe, a valve for controlling said water inlet, a lever for operating said valve, a float on said lever, an auxiliary float in said tank, a supporting member for said auxiliary float, a locking member carried by said lever and means whereby said locking member engages said supporting member to hold said lever depressed when the auxiliary float is in its lower position and additional means for releasing the locking member when the auxiliary float is raised.

3. In a flush tank, a container, a water inlet, an outlet, an over-flow pipe, a valve near one end of the container for controlling said water inlet, a lever for operating said valve, a float on said lever, a shaft, a pivoted member on said shaft, an auxiliary float on said pivoted member, means for securing the shaft in the container, said means including clamping portions adapted to be urged against the walls of the tank, and means whereby said auxiliary float is adapted to hold the valve lever depressed when the auxiliary float is in its lower position.

4. In a flush tank, a container, an inlet, a valve for controlling the inlet, a lever movable in a substantially vertical plane for operating the valve, said lever being movable through an arc of less than 90°, a float on said lever, a pivotally mounted member, a float carried at one end of the pivotally mounted member, and means coacting with said pivoted operating lever and with said member to hold the valve open when the valve operating lever is depressed, and other means associated with the pivotally mounted member for releasing the valve operating lever when the float carried by the pivotally mounted member is raised.

5. A flush tank including a container, a water inlet, an outlet, an overflow pipe, a valve for controlling said water inlet, a lever for operating said valve, a float on said lever, a locking member pivotally mounted on said lever, said locking member including an engaging portion, an auxiliary float adjacent said lever, a pivoted member for supporting said auxiliary float, a roller on said pivoted member, said locking member adapted to move relative to the pivoted member, said roller adapted to engage said engaging portion to hold the locking member in operative position when the auxiliary float is in its lower position, means on said locking member for causing said auxiliary float to move the roller from the engaging position when the auxiliary float is raised.

6. In a flush tank, a container, a water inlet, an outlet, an over-flow pipe, a valve for controlling said water inlet, a lever for operating said valve, a float mounted on said lever, and an arm pivotally mounted on said lever, said arm comprising a substantially L-shaped member having a re-entrant portion on one limb of the L, said re-entrant portion including a hump, an auxiliary float, a support for said auxiliary float, means on said support for engaging the hump to hold the lever depressed when the auxiliary float is in its lower position and additional means for engaging the re-entrant portion to release said first mentioned means when the auxiliary float is raised.

7. A flush tank including a container, a water inlet, an outlet, an overflow pipe, a valve for controlling said water inlet, a lever for operating said valve, a float on said lever, a locking member pivotally mounted on said lever, a re-entrant portion on said locking member, a hump on said re-entrant portion, an auxiliary float adjacent said lever, an L-shaped pivoted member for supporting said auxiliary float, a roller on said L-shaped member, said locking member adapted to move relative to the L-shaped member so that the roller is adapted to engage said hump to hold the locking member in operative position when the auxiliary float is in its lower position and means on said L-shaped member for engaging said re-entrant portion to release the roller from the hump when the auxiliary float is raised.

In testimony whereof, I hereunto affix my signature.

HERMAN R. CUNNINGHAM.